R. V. WHITAKER, Jr.
GREASE CARTRIDGE OR CONTAINER.
APPLICATION FILED NOV. 29, 1909.
963,840.
Patented July 12, 1910.
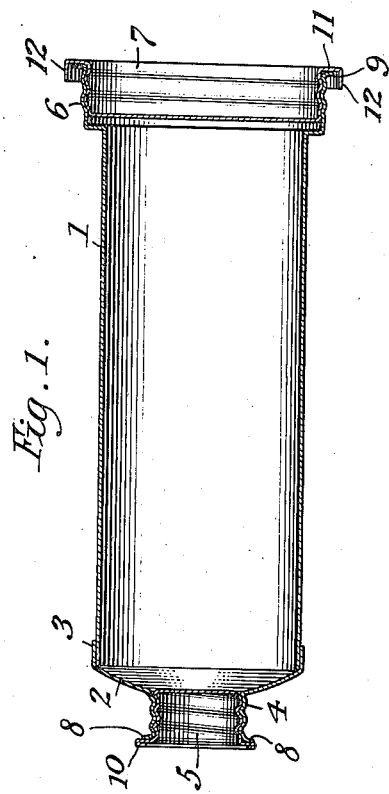
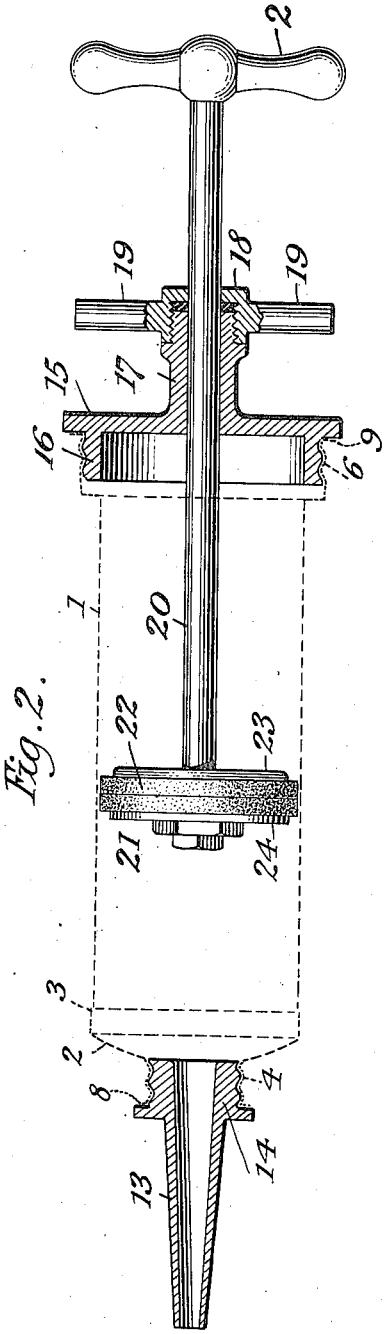

UNITED STATES PATENT OFFICE.

RICHARD V. WHITAKER, JR., OF NEW BRUNSWICK, NEW JERSEY.

GREASE CARTRIDGE OR CONTAINER.

963,840.      Specification of Letters Patent.      Patented July 12, 1910.

Application filed November 29, 1909. Serial No. 530,338.

*To all whom it may concern:*

Be it known that I, RICHARD V. WHITAKER, Jr., a citizen of the United States, residing at New Brunswick, county of Middlesex, and State of New Jersey, have invented certain new and useful Improvements in Grease Cartridges or Containers, of which the following is a full, clear, and exact description.

My invention relates to containers for lubricants, for example axle-grease, and is designed more particularly for automobilists' use. Its chief object is to provide a cheap and effective container or "cartridge" which can be furnished filled or loaded with suitable lubricating material, so as to be ready for instant use at any time.

To this and other ends the invention comprises the novel features of construction hereinafter described.

The preferred embodiment of the invention is illustrated in the annexed drawing, in which—

Figure 1 shows the cartridge or container in longitudinal section. Fig. 2 is a part-sectional view showing convenient and effective devices for expelling the grease from the cartridge and applying it to the parts to be lubricated.

The body of the cartridge, designated by 1, is preferably cylindrical in form and made of inexpensive material, for example thin sheet brass, tin, etc. At one end the body is provided with a bulging or convex cap 2 having a flange 3 fitting snugly over the body, to which the flange is soldered or otherwise permanently secured. At the center of the cap is a neck 4, formed with screw threads, as shown, to receive a removable screw-plug member or stopper 5. On the opposite end is an annulus 6, also threaded, and of somewhat larger diameter than the body. This end of the cartridge is closed by a threaded cap member 7, screwed into the annulus. Both the neck and the annulus are made of sheet metal, and the threads are formed preferably by rolling or spinning. The edge of each is extended outwardly to form inclined lips 8, 9, and the closure members 5, 7, are formed with outwardly extending flanges 10, 11, so that when the closures are screwed home the flanges will be engaged by the resilient lips mentioned. This method provides an hermetic joint and is at once cheap and effective for such purpose. The flange 11 may be turned back axially, as shown at 12, for more convenient grasping by the hand. This part, and the edge of flange 10, are preferably milled or knurled to afford a firm gripping surface for the fingers. The cartridge is filled with the desired material, for example grease of the usual viscous or semi-solid consistency, and the closures are screwed in so as to bring their flanges into firm contact with the resilient lips; after which the cartridge can be handled without danger of soiling the hands or clothing.

Simple and effective devices for expelling and applying the grease are shown in Fig. 2. In this figure, 13 designates a tapering discharge member or nozzle provided with a threaded base member 14 which can be screwed into the neck 4. The disk or head member 15 has a threaded flange 16, to fit inside the annulus 6, and also carries a tubular stem 17. Threaded on the stem is a gland or stuffing box 18, provided with wings or pins 19 by which it may be readily turned for removal and replacement. Sliding through the stuffing box and stem is a rod 20, having at its inner end a head 21 composed of rings 22, of leather or other suitable material gripped firmly between two disks 23, 24. On the other end of the rod is a handle 25. The inner diameter of the threaded flange of the cap 15 is preferably slightly larger than the inner diameter of the body of the cartridge so that when the plunger is drawn back to its full extent the disk 24 on the head 21 will be substantially flush with the edge of the threaded flange 16 and the plunger will lie wholly within the cap.

When the grease is to be used the closure members 5 and 7 are unscrewed, the discharge member or nozzle 13 is screwed into the neck 4, and the head member or disk 15, with its plunger retracted, is screwed into the annulus 6. Pressure on the plunger will now expel the contents of the cartridge through the nozzle, thus enabling the grease to be applied, quickly and without waste, directly to the part or parts which are to be lubricated. When the operation is finished the expelling devices may be left on the body of the cartridge or they may be removed and the original closures replaced, as desired.

As before stated, the cartridge is furnished loaded; it is also cheaply made, of inexpensive material, so that when emptied it may be thrown away without loss, the user of course retaining the expelling and applying devices for use with another cartridge. It will thus be seen that my improved container or cartridge affords a convenient and effective method of carrying and applying lubricant. The cartridge being furnished already loaded, the user is saved the inconvenience of filling the container. He simply attaches the nozzle and plunger, and applies the grease in such quantity as may be needed.

It is to be understood that the form herein specifically shown and described is merely the preferred embodiment, and may be modified in various ways without departure from the proper spirit and scope of the invention.

What I claim is:

As a new article of manufacture a grease cartridge or container comprising a cylindrical body portion having an enlarged end provided with an interior screw thread and an outwardly projecting resilient flange at the extremity of said enlarged end, a cap secured on the opposite end of the body portion and formed with a threaded neck of less diameter than said body and interiorly threaded, said neck having a resilient outwardly projecting terminal lip, and members adapted to be screwed into said threaded portions of the cartridge provided with flanges arranged to engage the resilient lips and form hermetic joints.

In testimony whereof I affix my signature in the presence of two subscribing witnesses.

RICHARD V. WHITAKER, Jr.

Witnesses:
JOHN J. PARSONS,
W. E. EDMONDS.